(12) United States Patent
Park

(10) Patent No.: US 8,284,361 B2
(45) Date of Patent: Oct. 9, 2012

(54) METHOD OF FABRICATING AN IPS MODE LCD USING BOTH A RUBBING PROCESS AND A LIGHT IRRADIATION PROCESS

(75) Inventor: SuHyun Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 874 days.

(21) Appl. No.: 11/312,956

(22) Filed: Dec. 21, 2005

(65) Prior Publication Data

US 2006/0146257 A1 Jul. 6, 2006

(30) Foreign Application Priority Data

Dec. 30, 2004 (KR) .................. 10-2004-0117247

(51) Int. Cl.
- *G02F 1/13* (2006.01)
- *G02F 1/1337* (2006.01)
- *G02F 1/1343* (2006.01)

(52) U.S. Cl. ........ 349/129; 349/123; 349/124; 349/126; 349/141; 349/187

(58) Field of Classification Search .......... 349/123–136, 349/141, 187
See application file for complete search history.

(56) References Cited

U.S. PATENT DOCUMENTS

| | | | |
|---|---|---|---|
| 6,292,244 B1 * | 9/2001 | Kuo et al. | 349/129 |
| 6,411,358 B2 * | 6/2002 | Song et al. | 349/141 |
| 7,244,627 B2 * | 7/2007 | Lee et al. | 438/30 |
| 2001/0050744 A1 * | 12/2001 | Song et al. | 349/139 |
| 2002/0057412 A1 * | 5/2002 | Ashizawa et al. | 349/143 |
| 2003/0214623 A1 * | 11/2003 | Ebisu et al. | 349/156 |
| 2004/0033038 A1 * | 2/2004 | Xu et al. | 385/122 |
| 2004/0233378 A1 * | 11/2004 | Okamoto et al. | 349/156 |

FOREIGN PATENT DOCUMENTS

| | | |
|---|---|---|
| JP | 11-212095 A | 8/1999 |
| JP | 11-305256 A | 11/1999 |
| JP | 11305256 A * | 11/1999 |
| KR | 2001-0097210 A | 11/2001 |

\* cited by examiner

*Primary Examiner* — Jessica M Merlin

(74) *Attorney, Agent, or Firm* — McKenna Long & Aldridge LLP

(57) ABSTRACT

Provided is a method of fabricating an IPS mode LCD having improved image quality. After performing a rubbing process on an entire surface of an alignment layer in the IPS mode LCD, polarization and non-polarization irradiations are partially performed on a stepped portion around an electrode using masks. Accordingly, light leakage can be prevented and the contrast ratio can be improved. Also, the high quality of image can be obtained, thereby enhancing the reliability of products. Also, when non-polarized light is irradiated on a rubbed alignment layer, a high quality image can be obtained without any separate polarization apparatus. Consequently, the manufacturing process is simplified and manufacturing costs are reduced.

13 Claims, 10 Drawing Sheets

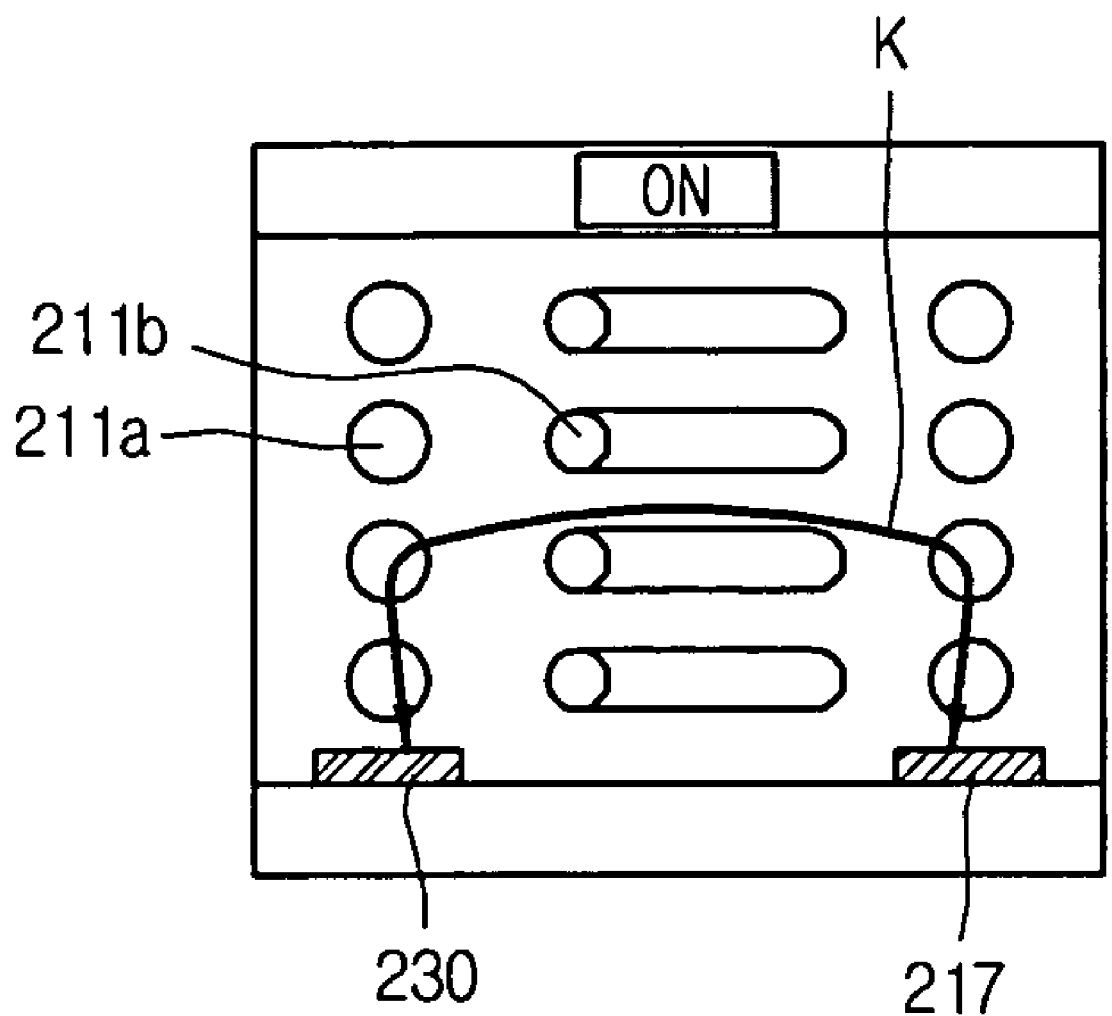

STEP DIFFERENCE OF 3000Å, TAPER ANGLE OF 60°

LIGHT LEAKAGE IN ELECTRODE PART

STEP DIFFERENCE OF 2000Å, TAPER ANGLE OF 35°

LIGHT LEAKAGE IN ELECTRODE PART (a)

(b)

STEP DIFFERENCE OF 5000Å, TAPER ANGLE OF 75°

LIGHT LEAKAGE IN ELECTRODE PART

METHOD OF FABRICATING AN IPS MODE LCD USING BOTH A RUBBING PROCESS AND A LIGHT IRRADIATION PROCESS

This application claims the benefit of the Korean Patent Application No. 10-2004-117247, filed on Dec. 30, 2004, which is hereby incorporated by reference as if fully set forth herein.

BACKGROUND OF THE INVENTION

1. Field of the Invention

The present invention relates to a liquid crystal display device, and more particularly, to a method of fabricating an IPS mode LCD and a method of forming an alignment layer in the IPS mode LCD, capable of improving the image quality of the LCD.

2. Discussion of the Related Art

Generally, a cathode ray tube (CRT) has been most widely used among display devices to display image data on a screen. The CRT is inconvenient because of its large volume and heavy weight compared with its display area.

With the development of electronic industries, the display devices that were previously limited to a television (TV) and a monitor are being used, for example, in personal computers, notebook computers, wireless terminals, vehicle instrument panels, and electronic display boards. Also, due to the development of information communication technology, it is necessary to transmit a large capacity of image information. Therefore, the importance on a next generation display device capable of processing and displaying the large capacity image information increases gradually.

Such next generation display devices are required to be light weight, have a slim profile, high brightness, a large-sized screen, low power consumption, and a low price. Among such next generation display devices, a liquid crystal display device (LCD) draws attraction.

The LCD exhibits a better resolution than other flat displays and has a rapid response time compared to that of the CRT in implementing a moving picture.

As one of the LCDs that are widely used at the present time, there is a twisted nematic (TN) mode LCD. In the TN mode LCD, after electrodes are respectively formed on two substrates and liquid crystal directors are aligned such that they are twisted by 90°, a driving voltage is applied to the electrodes to drive the liquid crystal directors.

However, the TN mode LCD has a serious drawback of a narrow viewing angle.

Recently, LCDs employing a new mode are being actively researched to solve the narrow viewing angle of TN mode LCDs. Examples of the new mode LCDs, include an in-plane switching (IPS) mode LCD, and an optically compensated birefringence (OCB) mode LCD.

The IPS mode LCD generates a horizontal electric field so as to drive the liquid crystal molecules in a horizontal direction with respect to the substrates by forming two electrodes on a single substrate and applying a voltage between the two electrodes. In other words, the major axis of the liquid crystal molecule does not stand up with respect to the substrates but rotates horizontally.

The IPS mode LCD has a small variation in the birefringence of liquid crystal according to a visual direction and thus has an excellent viewing angle characteristic compared to the TN mode LCD.

A related art IPS mode LCD will be described in detail with reference to the accompanying drawings.

FIG. 1 is a sectional view of a related art EPS mode LCD. The related art IPS mode LCD includes a first substrate 118, a second substrate 119, and a liquid crystal layer 130 interposed between the first substrate 118 and the second substrate 119. The first substrate 118 and the second substrate 119 are attached opposite to each other. First, a metal is deposited on the first substrate 118 and patterned to form a plurality of gate lines and a gate electrode 109. The gate electrode 109 is branched from a gate line and disposed in a thin film transistor (TFT).

Next, a gate insulating layer 120 is formed on the substrate including the gate electrode 109. A semiconductor layer 115 having an active layer 115a and an ohmic contact layer 115b is formed on the gate insulating layer 120.

A data line 110 is formed on the gate insulating layer 120. The data line 110 and the gate line form a matrix configuration.

At this point, in forming the data line 110, source and drain electrodes 116 and 117 of the TFT are formed simultaneously.

A common line and a common electrode 113 are formed in parallel to the gate line.

A passivation layer 128 is formed on a resultant structure.

Thereafter, a data electrode 114 is formed such that it is electrically connected to the drain electrode 117 and is in parallel to the data line 110.

A first alignment layer 129 is formed on the resultant structure.

A black matrix 121 is formed on the second substrate 119 to prevent light leakage. A color filter layer 122 including red, green and blue color filter patterns is formed in an opening of the black matrix 121.

Next, on overcoat layer 123 is formed on the color filter layer to planarized the surface of the color filter layer and protect the color filter layer 122.

Then, a second alignment layer 126 is formed on the overcoat layer 123.

FIGS. 2A and 2B are sectional views of the related art IPS mode LCD when in an off-state and an on-state, respectively.

FIG. 2A illustrates the off-state of the IPS mode LCD. Because a horizontal electric field is not applied, there is no motion in the liquid crystal layer 211.

FIG. 2B illustrates an arrangement of the liquid crystal when a predetermined voltage is applied (that is, in the on-state). There is no phase change of the liquid crystal 211a disposed at a position corresponding to the common electrode 217 and the pixel electrode 230. However, due to the horizontal electric field K generated when a predetermined voltage is applied between the common electrode 217 and the pixel electrode 230, the liquid crystal 211b disposed between the common electrode 217 and the pixel electrode 230 is arranged in a direction identical to the horizontal electric field K.

That is, the IPS mode LCD has a wide viewing angle because the liquid crystal moves along the horizontal electric field.

FIG. 3 is a flowchart illustrating a method of fabricating a related art IPS mode LCD.

In operation S100, top and bottom substrates having the structure of FIG. 1 are manufactured.

In operation S110, a cleaning process is performed to remove foreign particles from the substrates. In operation S120, polyimide (PI) (a solution for an alignment layer) is printed on the substrates using an alignment printing apparatus.

In operation S130, a solvent contained in the solution is dried by applying a high-temperature heat to the solution for the alignment layer and a hardening process is then performed.

In operation S140, a surface of the hardened alignment layer is rubbed in one direction using a rubbing device, thereby forming grooves.

In operation S150, an adhesive seal pattern is formed at an edge of the top substrate, except a liquid crystal injection hole. Then, spacers are dispersed on the bottom substrate.

In operation S160, the two substrates are attached opposite to each other with an accuracy of several μm so as to prevent light leakage.

In operation S170, the attached substrates are cut into unit cells. This cutting process includes a scribing process for forming lines on the top and bottom substrates and a breaking process for dividing the scribed substrates into unit cells by applying an impact thereon.

In operation S180, liquid crystal is injected through an injection hole into a gap between the two substrates that are cut into cells, and the injection hole is then sealed to complete the fabrication of the LCD.

Here, the physical characteristic of the liquid crystal is changed by a molecular arrangement state thereof, and thus there occurs a difference in the response to an external force such as an electric field.

Due to the characteristic of the liquid crystal molecule, a control technique for an arrangement state of the liquid crystal molecule is essential for the study on the physical property of the liquid crystal and the construction of the LCD.

Specifically, a rubbing process for uniformly aligning liquid crystal molecules in one direction is essential for a normal driving of the LCD and a uniform display characteristic thereof.

The alignment layer forming process for determining an initial alignment direction of the liquid crystal molecules will now be described in detail.

The forming of the alignment layer includes a process of depositing a high polymer thin layer and a process of aligning an alignment layer in one direction.

The alignment layer is formed of a polyimide-based organic material and is aligned using a rubbing process.

According to the rubbing process, the polyimide-based organic material is deposited on a substrate and a solvent thereof is volatilized at about 60-80° C. Thereafter, the deposited material is hardened at about 80-200° C. to form an alignment layer. The alignment layer is rubbed in one direction using a rubbing cloth such as velvet to thereby form an alignment direction thereof.

This rubbing process enables an easy and stable alignment process and is thus suitable for mass production of the LCD.

However, the rubbing process may cause a defect when the alignment layer is rubbed using a roller wrapped with a poor rubbing cloth.

That is, since the rubbing process is performed through a direct contact between the rubbing cloth and the alignment layer, liquid crystal cells may be contaminated due to particles on the rubbing cloth. Also, TFTs may be damaged due to an electrostatic discharge, an additional cleaning process may be required after the rubbing process, and the liquid crystal molecules may be non-uniformly aligned in a widescreen LCD. Consequently, the production yield of the LCD will be degraded.

FIGS. 4A and 4B are respectively a sectional view and a plan view illustrating the alignment state of the liquid crystal in a stepped portion when electrode patterns such as the pixel electrode and the common electrode are formed in the pixel region in the related art IPS mode LCD.

In order to improve the viewing angle, a super IPS (S-IPS) mode LCD may be applied to the existing IPS mode LCD. Also, the IPS mode LCD is manufactured using 3-4 masks so as to reduce the number of manufacturing processes. However, the step difference of the substrate is increased. Therefore, the alignment defect increasingly occurs during the rubbing process.

In FIGS. 4A and 4B, because the alignment layer 351 is formed on the pixel electrode 330 patterned on the bottom substrate, a step difference occurs in an edge region of the pixel electrode 330.

The color filter layer 360 and the alignment layer 352 are formed on the top substrate facing the bottom substrate, and the liquid crystal layer 390 is formed between the top and bottom substrates.

Due to the step difference occurring in the edge of the electrode patterns within the pixel region, the alignment is not well achieved. Thus, causing problems in driving the liquid crystal.

If the liquid crystal is in a normally-black mode, a black color is displayed when no voltage is applied.

However, light leakage occurs in regions A of FIGS. 4A and 4B in the off-state when no gate voltage is applied.

That is, when no voltage is applied, the liquid crystal molecules must be aligned in the same direction as the rubbing direction of the alignment layers 351 and 352.

However, the stepped edge portion of the electrode 330 causes a non-uniform liquid layer 391 having an alignment direction different than the rubbing direction and also causes the liquid crystal of a uniform liquid layer 392 to have an alignment direction, different than the rubbing direction.

The non-uniform liquid crystal causes phase retardation of light. The phase retardation causes a linearly-polarized light to change into an elliptically-polarized light. The elliptically-polarized light causes phase retardation in the uniform liquid crystal layer formed near the color filter layer, resulting in a great phase retardation.

Consequently, when no voltage is applied in a normally-black mode, light of the backlight assembly passes through the region A. This causes light leakage in a black display state and a decrease in a contrast ratio, thereby making it difficult to implement a high image quality.

In order to improve the viewing angle, an S-IPS mode LCD is applied. Also, an IPS mode LCD is manufactured using 3-4 masks to reduce the number of manufacturing processes. In these IPS mode LCDs, the step difference of the substrate is increased to cause an increased alignment defect.

Accordingly, there is required a display device and method for preventing the degradation of image quality due to the stepped edge portion, such as an increase in a black brightness and a contrast ratio.

SUMMARY OF THE INVENTION

Accordingly, the present invention is directed to a method of fabricating an IPS mode LCD and a method of forming an alignment layer in the IPS mode LCD that substantially obviate one or more problems due to limitations and disadvantages of the related art.

An advantage of the present invention is to provide a method of fabricating an LCD and a method of forming an alignment layer in the LCD, capable of reducing light leakage caused by a stepped portion. Specifically, after a rubbing process is formed on an entire surface of a substrate, the entire surface of the substrate or the stepped portion is post-processed using an UV irradiation that is a non-rubbing method, and light is partially irradiated onto a light leakage region such as an electrode edge where light leakage occurs by using masks.

Additional advantages and features of the invention will be set forth in part in the description which follows and in part will be apparent from the description, or may be learned by practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a method of fabricating an IPS mode LCD, comprising: forming a gate line and a common line on a first substrate, the gate line and the common line being spaced apart from each other by a predetermined distance in a horizontal direction; forming a data line substantially perpendicular to the gate line; forming a plurality of common electrodes substantially parallel to the data line, and forming a pixel electrode crossing the common electrodes; forming a first alignment layer on the first substrate including the pixel electrode; performing a primary alignment process on the first alignment layer using a rubbing process; covering the first alignment layer with a mask, the mask having a transmission portion and a block portion; performing a secondary alignment process on at least one stepped portion of the gate line, the data line, the common electrode, and the pixel electrode by irradiating a beam having a predetermined energy on the first alignment layer via the mask; forming a color filter layer and a black matrix on a second substrate facing the first substrate; and forming a liquid crystal layer between the first substrate and the second substrate.

In another aspect of the present invention, there is provided a method of forming an alignment layer, including: forming an alignment layer on a substrate having a stepped portion; rubbing the alignment layer; covering a mask with the alignment layer with a mask; and irradiating light on the mask.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

In the drawings:

FIGS. 2A and 2B are sectional views of when the related art IPS mode LCD is in off-state and on-state, respectively.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
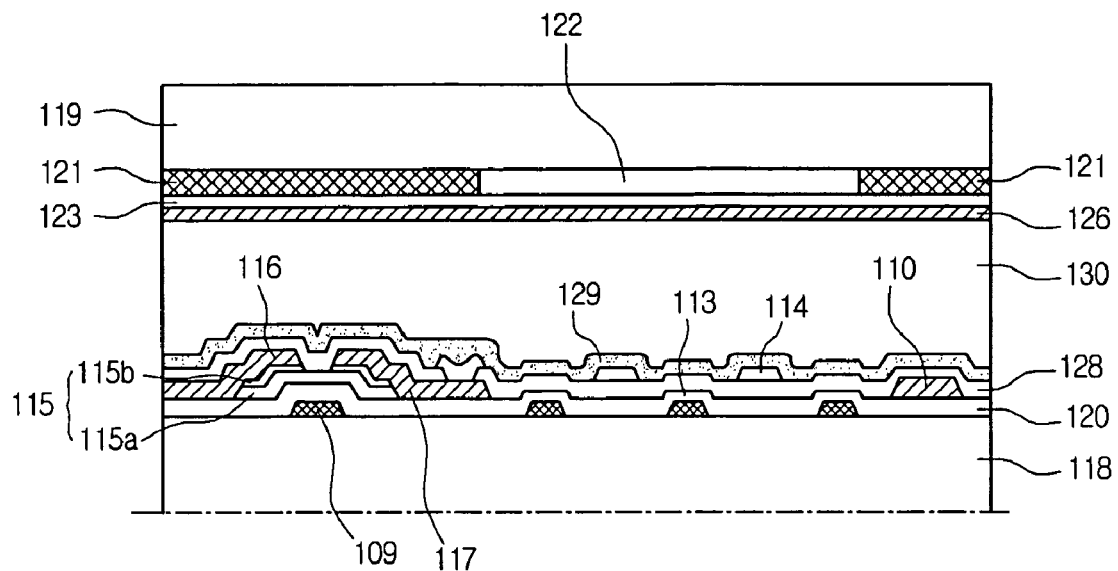
FIG. 1 is a sectional view of a related art IPS mode LCD.
Figure 2A:
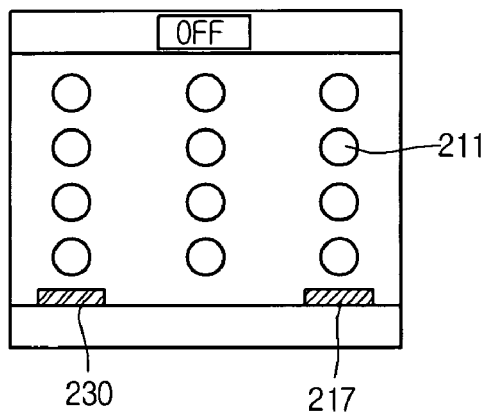
Figure 3:
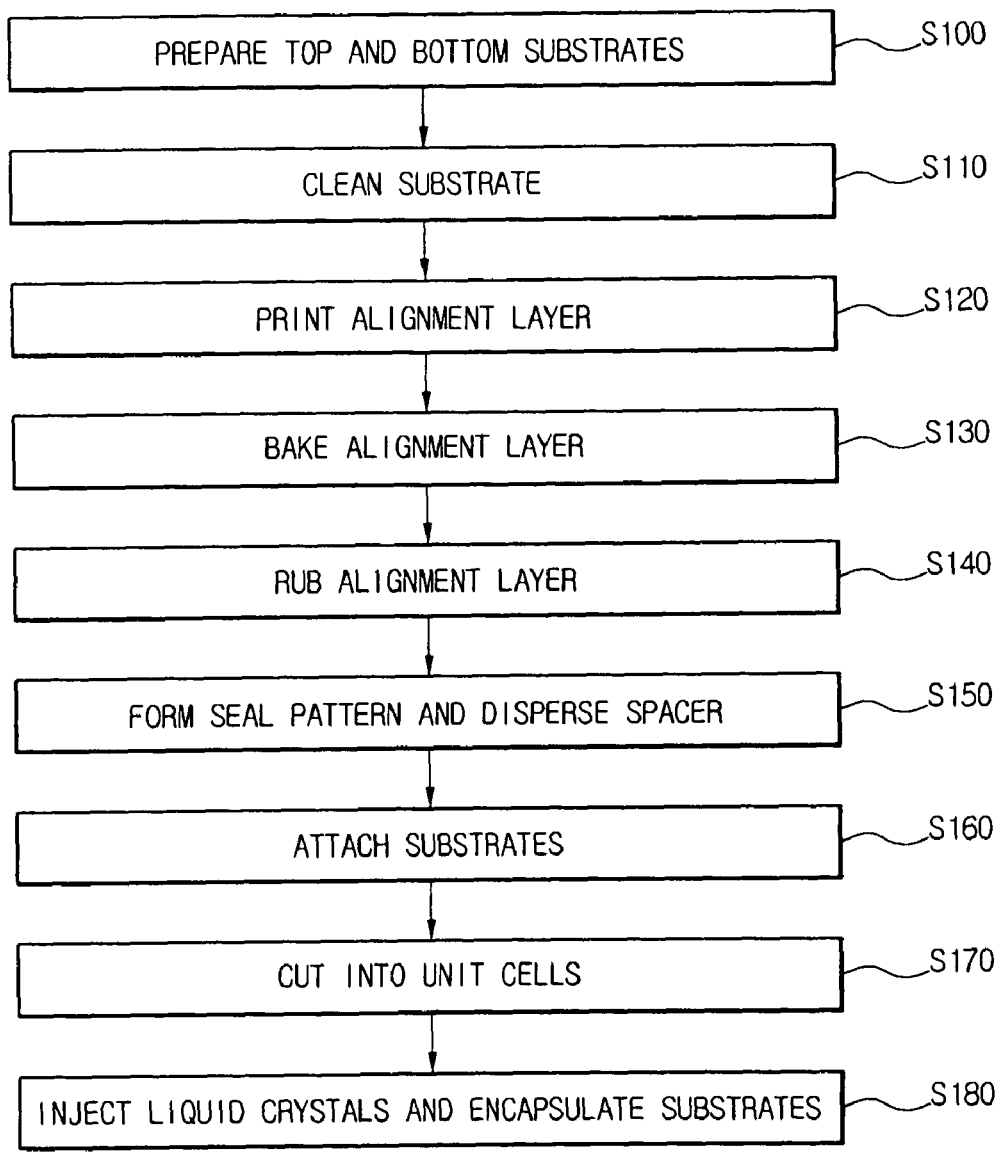
FIG. 3 is a flowchart illustrating a method of fabricating a related art IPS mode-LCD.
Figure 4A:
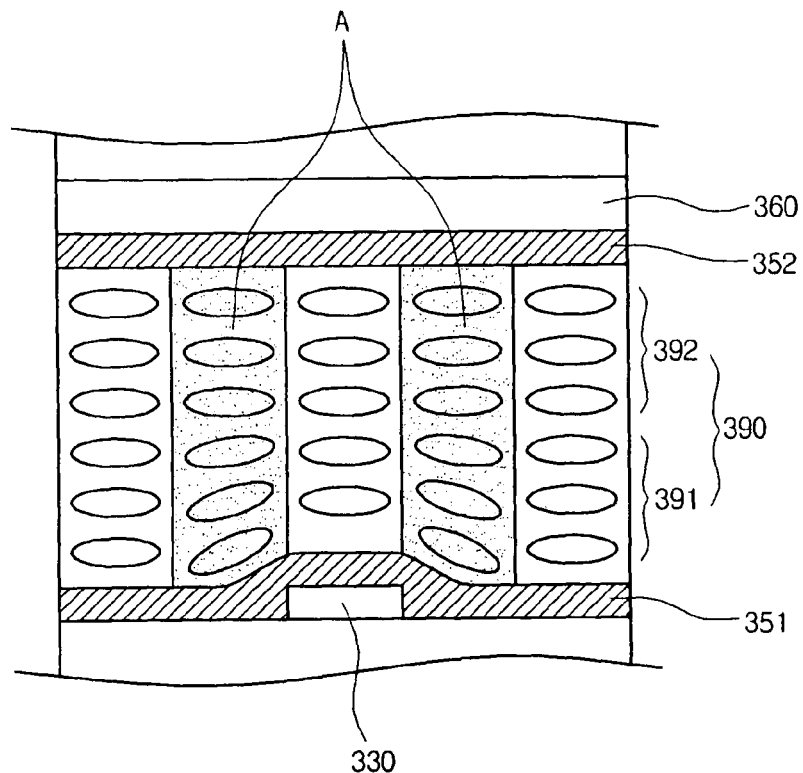
FIGS. 4A and 4B are respectively a sectional view and a plan view illustrating an alignment state of the liquid crystal in a stepped portion in the related art IPS mode LCD.
Figure 4B:
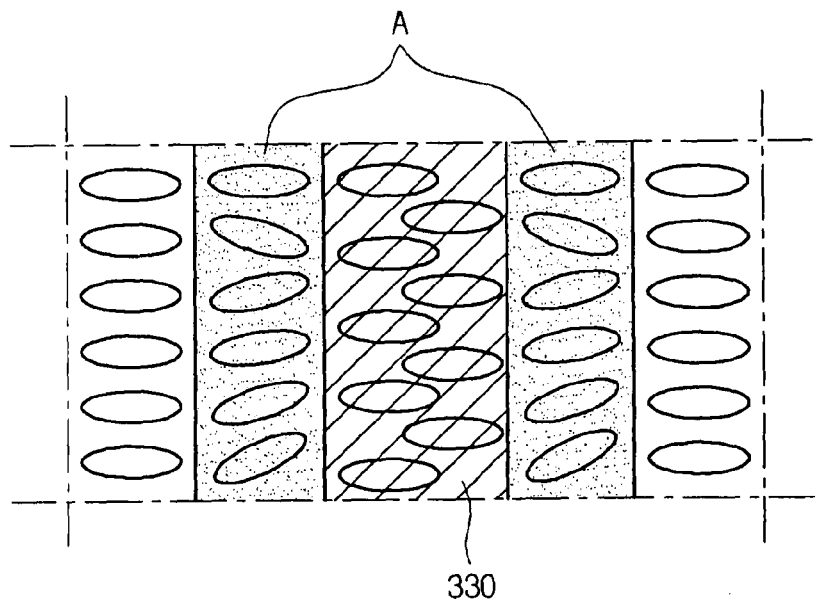
Figure 5:
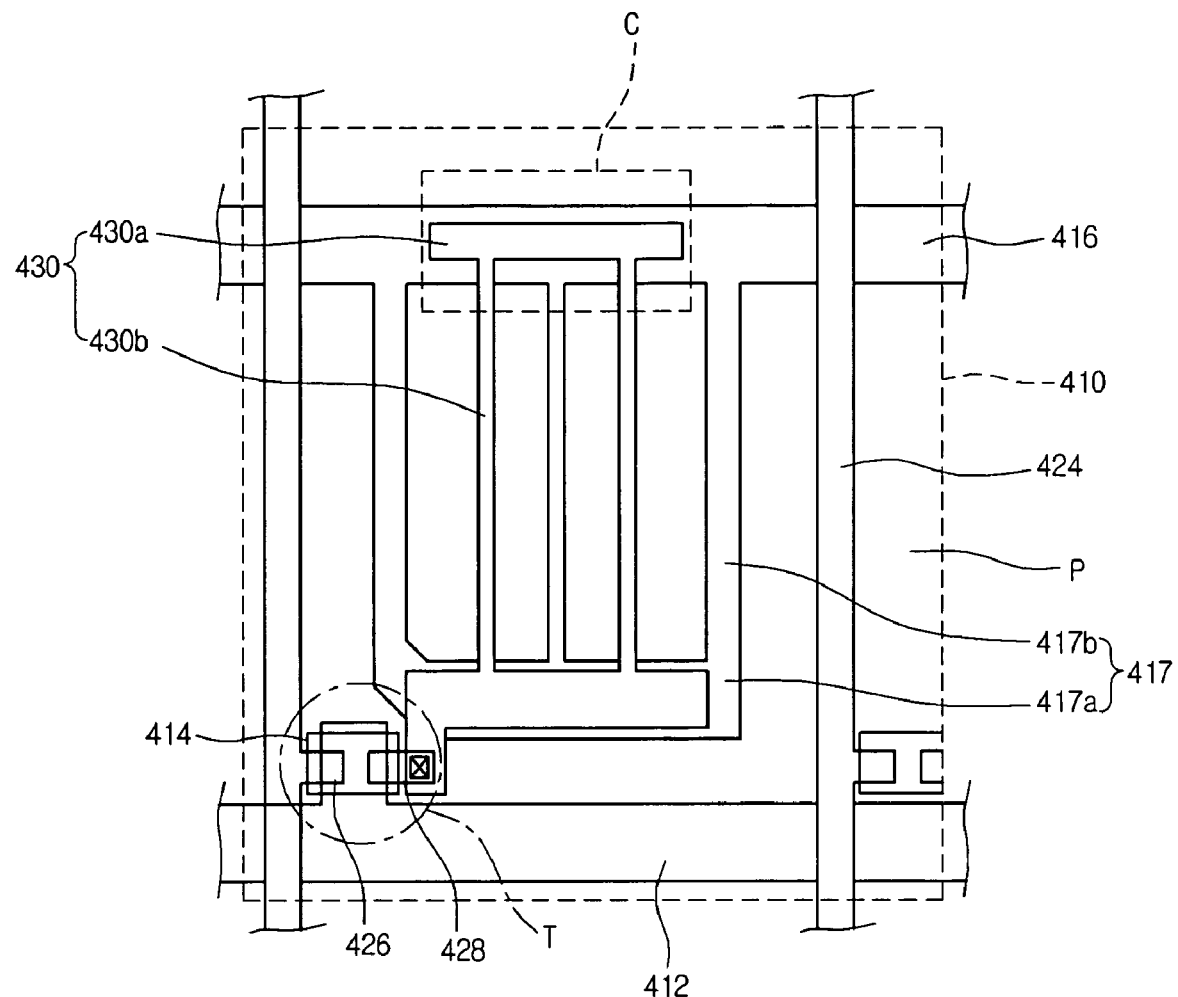
FIG. 5 is a plan view of an array substrate in an IPS mode LCD according to an embodiment of the present invention.

FIG. 5 is a plan view of an array substrate in an IPS mode LCD according to an embodiment of the present invention.

In FIG. 5, the array substrate 410 of the IPS mode LCD according to an embodiment of the present invention includes a plurality of gate lines 412 spaced apart from one another and arranged substantially parallel in one direction, a common line 416 disposed substantially parallel to the gate line 412 in one direction, and a data line 424 crossing the gate line 412 and the common line 416 and defining a pixel region P with the gate line 412.

A thin film transistor (TFT) is formed at a crossing of the gate line 412 and the data line 424. The TFT includes a gate electrode 414, a semiconductor layer (427 in FIGS. 6A and 6B), a source electrode 426, and a drain electrode 428. The source electrode 426 is connected to the data line 424, and the gate electrode 414 is connected to the gate line 412.

A pixel electrode 430 and a common electrode 417 are formed in the pixel region P. The pixel electrode 430 is connected to the drain electrode 428. The common electrode 417 is arranged substantially parallel to the pixel electrode 430 and is connected to the common line 416.

The pixel electrode 430 includes a plurality of vertical portions 430b and a horizontal portion 430a. The vertical portions 430b extend from the drain electrode 428 and are spaced apart from one another by a predetermined distance, such that the vertical portions 430b are arranged substantially parallel to the data line 424. The horizontal portion 430a connects the vertical portions 430b together on the common line 416.

The common electrode 417 includes a plurality of vertical portions 417b and a horizontal portion 417a. The vertical portions 417 extend vertically downward from the common line 416 and are alternately arranged in parallel with the vertical portions 430b of the pixel electrode 430. The horizontal portion 417a connects the vertical portions 417b together.

The horizontal portion 430a of the pixel electrode 430 is formed on a part of the horizontal portion of the common line 416, with a gate insulating layer (419 in FIG. 6) being interposed therebetween. The horizontal portion 430a of the pixel electrode 430 and the common line 416 form a storage capacitor C.

The data line 424, the pixel electrode 430, and the common electrode 417 may be formed in a zigzag structure.

Hereinafter, a method of fabricating the IPS mode LCD illustrated in FIG. 5 will be described.

FIGS. 6A to 6E are sectional views illustrating a method of fabricating the IPS mode LCD according to an embodiment of the present invention.

Figure 6A:
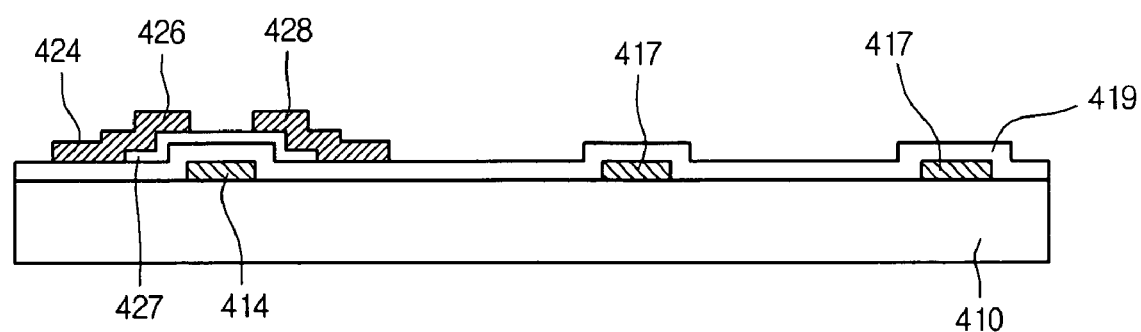
FIGS. 6A to 6E are sectional views illustrating a method of fabricating the IPS mode LCD according to an embodiment of the present invention.

In FIG. 6A, a low-resistance metal having a low resistivity is deposited on an array substrate 410 to prevent signal retardation. The low-resistance metal layer is then patterned by photolithography to form a gate line (412 in FIG. 5) and a gate electrode 414 of a TFT, which is branched from the gate line 412.

The low-resistance metal may be copper (Cu), aluminum (Al), aluminum alloy (AlNd), molybdenum (Mo), chrome (Cr), titanium (Ti), tantalum (Ta), or molybdenum tungsten (MoW).

In forming the gate line 412 and the gate electrode 414, a common line (416 in FIG. 5) and a plurality of common electrodes 417 are formed. The common line 416 is disposed substantially parallel to the gate line 412 and the plurality of common electrodes 417 are branched from the common line 416.

Then, a gate insulating layer 419 is formed by depositing an inorganic insulating material (e.g., silicon nitride (SiNx) or silicon oxide (SiOx)) on an entire surface of the array substrate 410 with the gate line 412 by a plasma enhanced chemical vapor deposition (PECVD) process or the like.

A material such as amorphous silicon is deposited on the gate insulating layer 419 and is selectively removed to form a semiconductor layer 427 in an island shape on the gate insulating layer 419.

Although not shown, an ohmic contact layer can be further formed by implanting impurity ions into the amorphous silicon and can be then patterned.

Figure 6B:
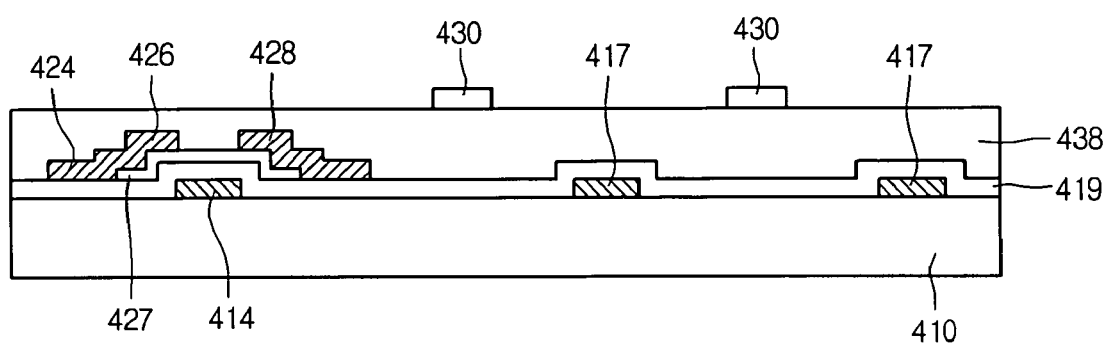

In FIG. 6B, a metal, such as Cr, Al, Cu, Mo, Ti, Ta, MoW, and Al alloy, is deposited on an entire surface of the substrate above the gate insulating layer 419 and then is patterned using photolithography to thereby form a data line 424. The data line 424 crosses the gate line 412 in a vertical direction and thus defines a pixel region. At the same time, a source electrode 426 and a drain electrode 428 are formed at both ends of the semiconductor layer 427.

A passivation layer 438 is formed by coating a silicon nitride layer or an organic insulating layer, such as benzocyclo-butene (BCB), on an entire surface of the array substrate 410 where the data line 424 is formed. Then, a contact hole (not shown) is formed in the drain electrode 428.

A transparent conductive layer is deposited on an entire surface using a transparent conductive material (e.g., indium tin oxide (ITO) or indium zinc oxide (IZO)) and then is patterned to form a plurality of pixel electrodes 430. The plurality of pixel electrodes 430 are connected to the drain electrode 428 and disposed between the common electrodes 417 in parallel with the data line 424. Thus, the pixel electrodes 430 and the common electrodes 417 are arranged in an alternating pattern.

Although not shown, when the pixel electrodes 430 are formed of a metallic material, the pixel electrodes 430 can be formed of the same material as the data line 424 and at the same time of formation of the data line 424, before forming the passivation layer 438.

Figure 6C:
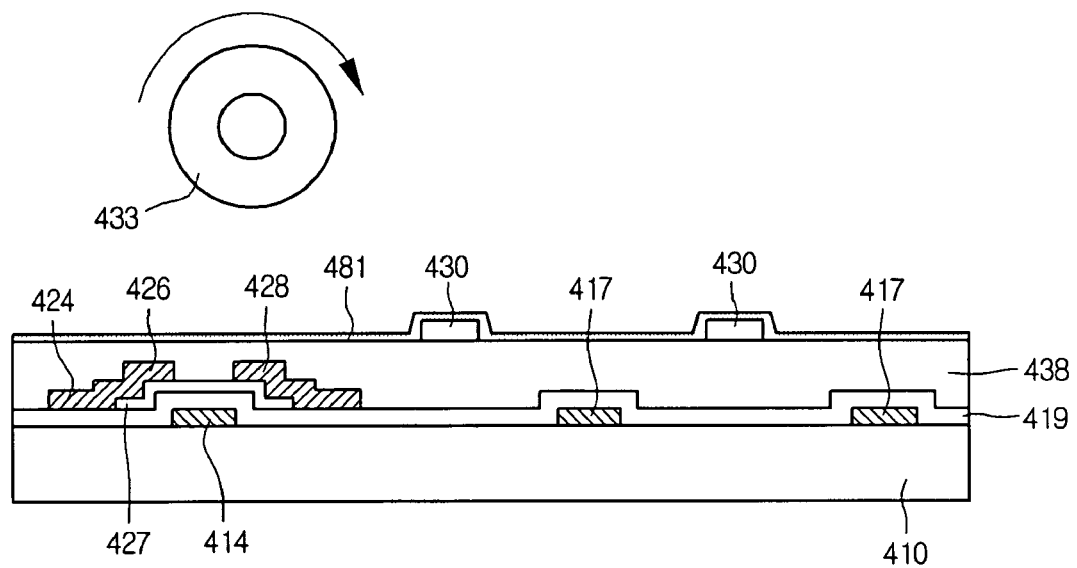

In FIG. 6C, an alignment layer is formed on an entire surface of the substrate including the pixel electrodes 430. A first alignment layer 481 is formed by printing a polyimide resin on the substrate and drying it. The polyimide resin has good heat resistance and good affinity with liquid crystal. Then, a primary alignment process is performed using a rubbing process.

In addition to the polyimide resin, a material for the alignment layer may be polyamic acid, polyethleneimine, polyvinyl alcohol, polyamide, polyethylene, polystyrene, poly-phenylenephthalamide, polyester, polyurethane, and polymethylmethacrylate, which includes polymer of which bond is selectively broken by UV irradiation.

The alignment layer has a permittivity of about 2-5 and refractivity of about 1-2.

Figure 6D:
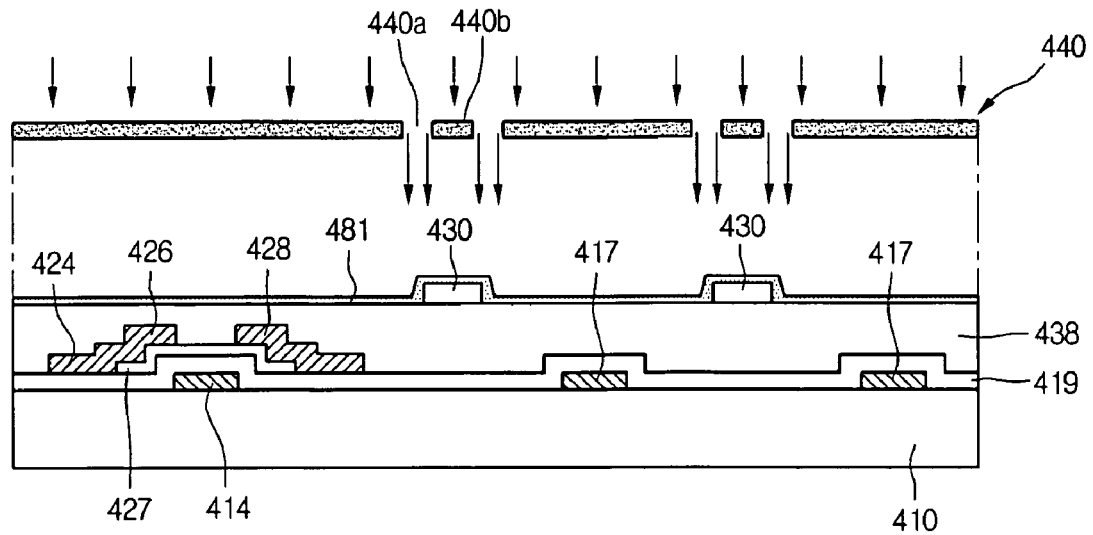
Figure 6E:
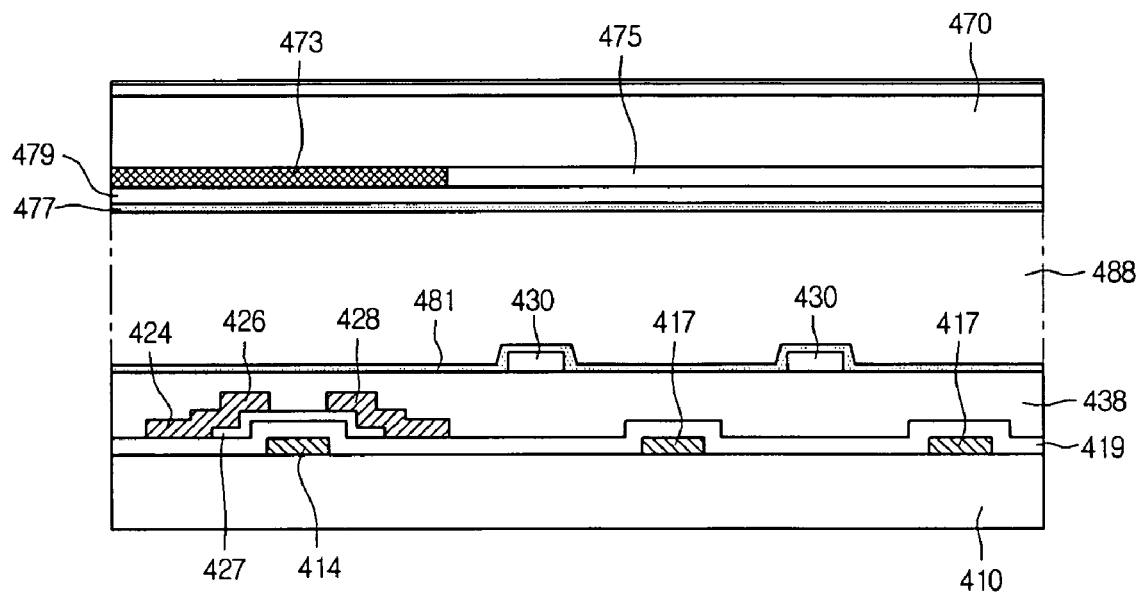

In FIG. 6D, a secondary alignment process is performed on the first alignment layer 481 that has undergone the primary alignment process.

Specifically, the primary alignment process is a rubbing process that forms an alignment direction by rubbing the first alignment layer 481 in one direction using a rubbing cloth 433 (e.g., velvet, rayon, nylon, etc.) on the first alignment layer 481 formed of polyimide.

Then, the secondary alignment process is performed by irradiating light onto the rubbed first alignment layer 481.

The light may be a linearly polarized light, a partially polarized light, or a non-polarized light.

The primary alignment process is performed using light irradiation, and then the alignment layer is processed by the rubbing process that is the secondary alignment process.

Also, the primary alignment process and the secondary alignment process may be performed simultaneously.

When the rubbing direction coincides with the light alignment direction, the alignment can be maximized.

In this manner, the uniform alignment in the stepped portion around the electrode part can be achieved by performing the secondary alignment process such as the light irradiation on the first alignment layer 481 that has undergone the primary alignment process.

At this point, the secondary alignment process is performed while covering the substrate with a mask 440 and 540 respectively having transmission portions 440a and 540a and blocking portions 440b and 540b.

The masks 440 and 540 are used to minimize side defect by irradiating ultraviolet rays using the mask in a light leakage region (a desired region).

Consequently, an image-sticking problem due to the side defect can be solved.

Figure 7:
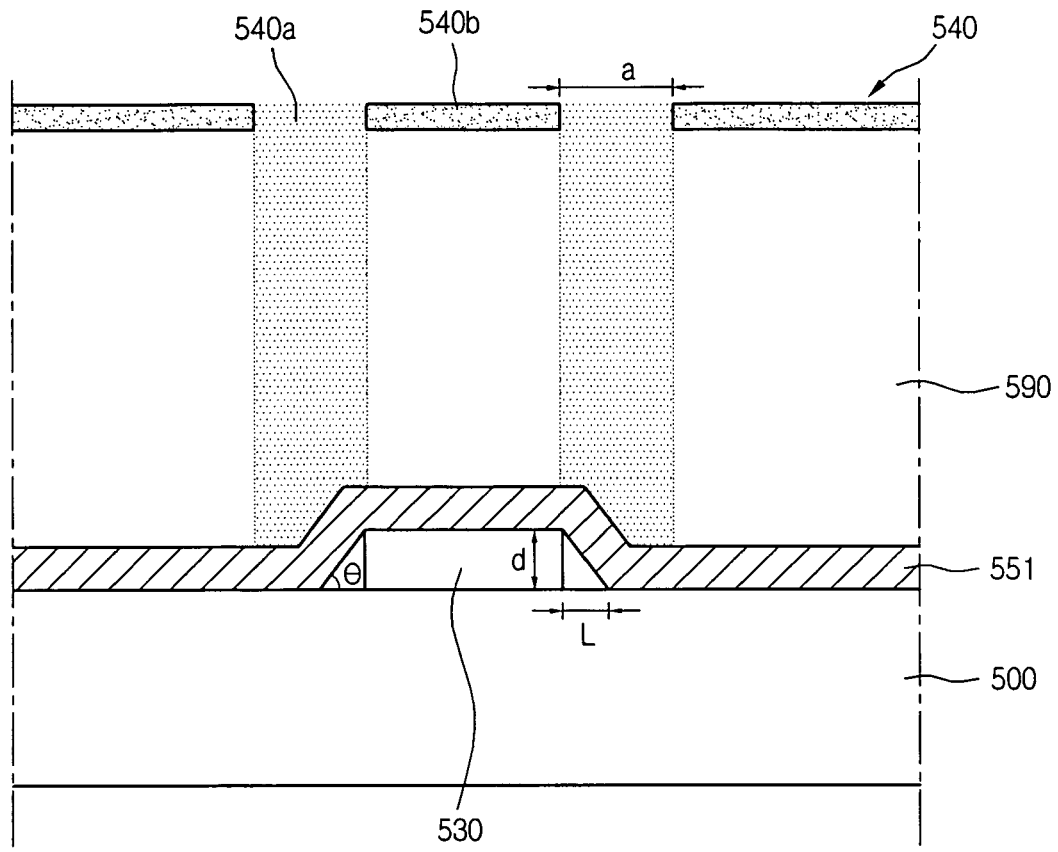
FIG. 7 is a sectional view of a stepped portion in the IPS mode LCD according to an embodiment of the present invention.

Referring to FIG. 7, the transmission portions 440a and 540a of the masks 440 and 540 correspond to a slope formed by the stepped portions where light leakage occurs.

A width (L) of the light leakage region in the stepped portion is $L = d/\tan\theta$.

A width (a) of the transmission portions 440a and 540a of the masks 440 and 540 is $a = L + 2M = d/\tan\theta + 2 \times M$ where M(mask margin)≦about 10 μm, about 100 Å<d (step height)<about 6000 Å, and about 45°<θ≦about 90°.

Light is irradiated onto the substrate 500 using the masks 440 and 540 having the transmission regions 440a and 540a corresponding to a slope formed by the stepped portions where light leakage occurs.

As described above, the secondary alignment process is performed by partially irradiating light onto a slope formed by the stepped portions around the electrode 530 where the alignment is non-uniform by the rubbing process that is the primary alignment process, thereby removing light leakage caused by the twist of the liquid crystal 590.

Referring back to FIG. 6E, a black matrix 473 is formed using a black resin or a metal (e.g., Cr or $CrO_x$) with high reflectivity so as to prevent light leakage in the gate line, the data line, and the TFT region, where liquid crystals on the color filter substrate 470 cannot be controlled.

Then, R, G and B color filters 475 for color reproduction are formed between openings of the black matrix 473 using an electrode position method, a pigment dispersion method, or a coating method. To protect the color filter layers 475, an overcoat layer 479 may be formed on an entire surface of the structure including the color filter layers 475.

Then, a second alignment layer 477 is formed on the overcoat layer 479 by printing polyimide material having good affinity with liquid crystals and good photo-sensitive properties. The second alignment layer 477 is formed to have an alignment direction substantially parallel to the first alignment layer 481 by using the same rubbing process as the alignment process of the first alignment layer 481, the same secondary alignment process of the partial light irradiation using the mask.

Then, a column spacer (not shown) is formed on the array substrate 410 or the color filter substrate 470. A liquid crystal layer 488 is formed in a display region of the array substrate 410 or the color filter substrate 470 using a liquid crystal injection or liquid crystal dropping method. Next, a seal member is formed along edges of the array substrate 410 or the color filter substrate 470, and the array substrate 410 and the color filter substrate 470 are attached together in a vacuum state.

Figure 8A:
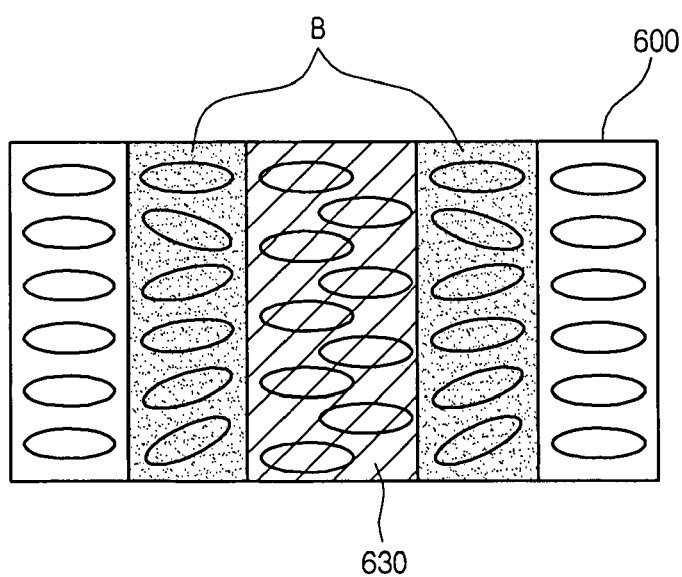
FIG. 8A is a view of when only a rubbing is performed on an alignment layer as a primary alignment process in the IPS mode LCD according to the present invention.
Figure 8B:
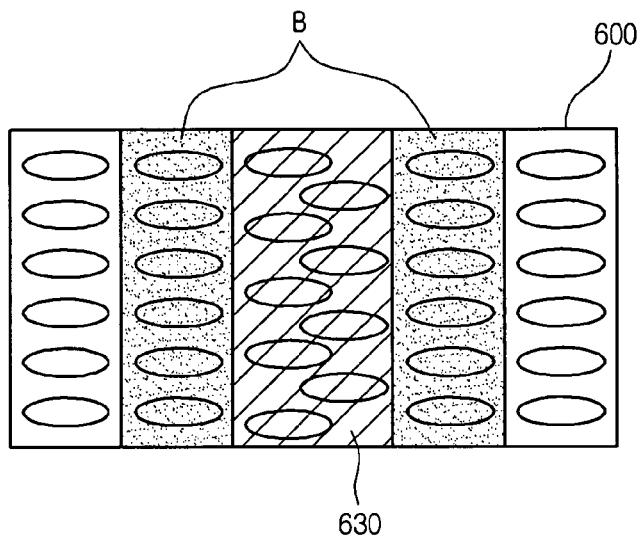
FIG. 8B is a view of when a light irradiation is performed on the primarily-processed alignment layer as a secondary alignment process in the IPS mode LCD according to the present invention.

FIGS. 8A and 8B are plan views illustrating the alignment of the liquid crystal in the electrode part in the IPS mode LCD according to the present invention.

As illustrated in FIGS. 8A and 8B, the alignment layer is formed on the electrode in which the stepped portion is formed in the substrate 600 of the IPS mode LCD according to the present invention.

At this point, the step height (d) of the electrode is about 100 Å$\leq$d$\leq$about 7000 Å.

A taper angle ($\theta$) of the electrode is about 45°<$\theta$$\leq$90°.

Referring to FIG. 8A, the alignment layer is formed on the substrate 600 by the primary alignment process.

In the primary alignment process, the alignment layer formed of an alignment material (e.g., polyimide) is rubbed in one direction using a rubbing cloth (e.g., velvet, rayon or nylon), thereby forming the alignment direction.

If rubbing the periphery B of the electrode part whose step difference is more than about 100-7000 Å, the alignment may not be obtained because the rubbing cloth does not come in contact with the alignment layer due to the stepped portion. Also, the alignment arrangement may not be uniform because the rubbing cloth is disarrayed while the rubbing cloth is passing the stepped portion.

Accordingly, as illustrated in FIG. 8B, the secondary alignment process of the light irradiation using the mask is performed on the alignment layer that has undergone the primary alignment process.

Like this, if the secondary alignment process such as the light irradiation are performed on the primarily aligned alignment layer, the alignment in a slope formed by the stepped portion around the electrode part becomes uniform.

At this time, the light irradiation energy is about 0.001-5 J/cm$^2$.

The secondary alignment process is performed while covering the substrate with the mask having the transmission portion and the blocking portion.

The transmission portion of the mask correspond to a slope formed by the stepped portion where light leakage occurs.

Light is irradiated on the substrate using the mask having the transmission portion corresponding to a slope formed by the stepped portion where light leakage occurs.

Accordingly, the secondary alignment process is additionally performed by partially irradiating light on a slope formed by the stepped portion around the electrode 530 where the alignment is non-uniform due to the rubbing process that is the primary alignment process, thereby removing light leakage.

At this point, the rubbing direction may coincide with the light alignment layer.

The light irradiation may use a linearly polarized light, a partially polarized light, and a non-polarized UV light.

Figure 9:
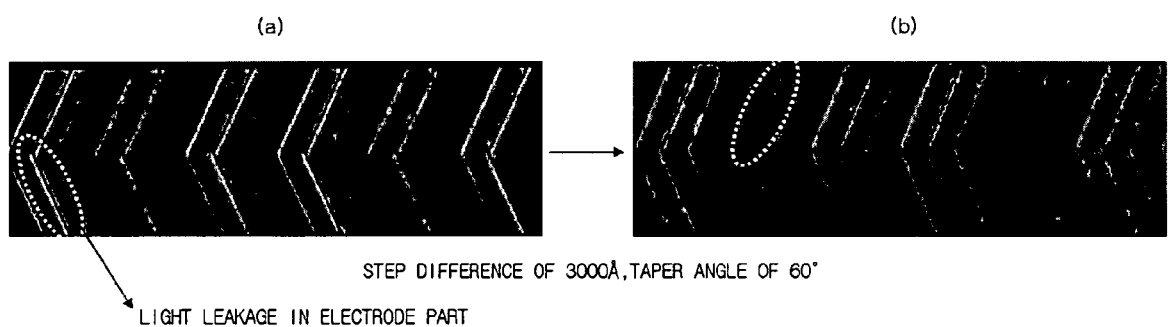
FIGS. 9 to 11 are photographs explaining the effect of the IPS mode LCD according to the present invention.
Figure 10:
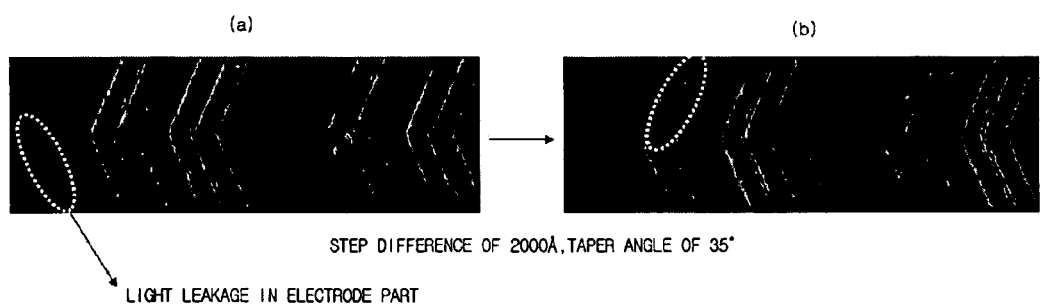
Figure 11:
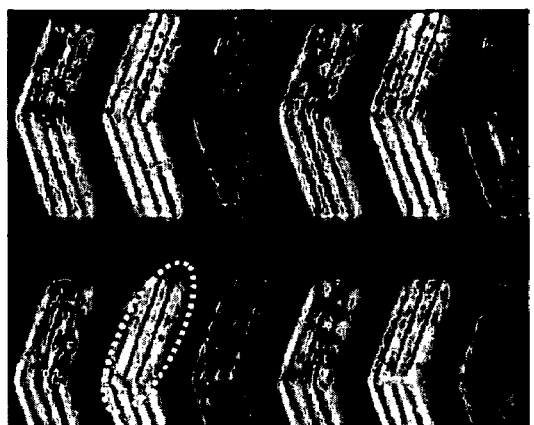
Figure 11:
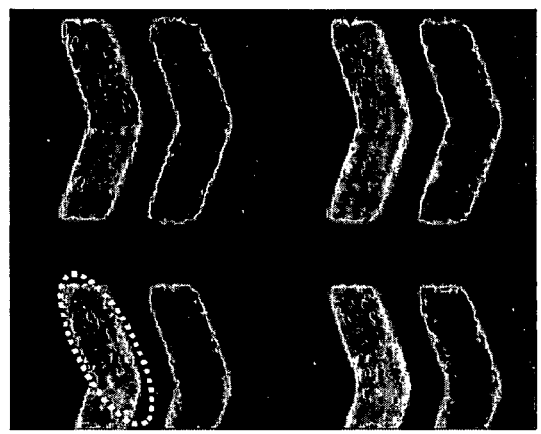

FIGS. 9 to 11 are photographs explaining the effect of the IPS mode LCD according to the present invention.

FIGS. 9(a) and 9(b) are photographs illustrating the degree of light leakage after the primary and secondary alignment processes when the step difference of the electrode part is 3000 Å and the taper angle of the electrode is 60°.

Specifically, in FIG. 9(a), light leakage occurs because the alignment is uniform around the electrode part when the rubbing process of the primary alignment process is performed. On the contrary, in FIG. 9(b), light leakage is remarkably reduced when the light irradiation as the secondary alignment process is partially performed around the electrode part after the primary alignment process.

In FIG. 10(a), light leakage occurs because the alignment is uniform around the electrode part when the rubbing process as the primary alignment process is performed. On the contrary, in FIG. 10(b), light leakage is remarkably reduced when the light irradiation as the secondary alignment process is partially performed around the electrode part after the primary alignment process.

FIGS. 11(a) and 11(b) are photographs illustrating the degree of light leakage after the primary and secondary alignment processes when the step difference of the electrode part is 5000 Å and the taper angle of the electrode is 75°.

In FIG. 11(a), light leakage occurs because the alignment is uniform around the electrode part when the rubbing process as the primary alignment process is performed. On the contrary, in FIG. 9(b), light leakage is remarkably reduced when the light irradiation as the secondary alignment process is partially performed around the electrode part after the primary alignment process.

As described above, after performing the rubbing process on the entire surface of the alignment layer in the IPS mode LCD, polarization and non-polarization irradiations are partially performed on the stepped portion around the electrode using masks. Accordingly, light leakage can be prevented and the contrast ratio can be improved. Also, a high quality of image can be obtained, thereby enhancing the reliability of products.

In addition, when the non-polarized light is irradiated on the rubbed alignment layer, a high quality image can be obtained without any separate polarization apparatus. Consequently, the manufacturing process can be simplified and the manufacturing costs can be reduced.

Further, by irradiating the UV light on the light leakage region using the mask, side defects can be minimized and the image-sticking can be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an IPS mode LCD, comprising:
   forming a gate line and a common line on a first substrate, the gate line and the common line being spaced apart from each other by a predetermined distance in a horizontal direction;

forming a data line substantially perpendicular to the gate line;

forming a plurality of common electrodes substantially parallel to the data line, and forming a plurality of pixel electrodes crossing the common electrodes;

forming a first alignment layer on the first substrate including the pixel electrodes;

performing a primary alignment process on the first alignment layer using a rubbing process;

covering the first alignment layer with a mask, the mask including transmission portions corresponding to at least stepped portions of the pixel electrodes that have a non-uniform alignment in the rubbing process;

performing a secondary alignment process by partially irradiating a beam on the rubbed alignment layer corresponding to at least the stepped portions of the pixel electrodes via the transmission portions of the mask;

forming a color filter layer and a black matrix on a second substrate facing the first substrate; and forming a liquid crystal layer between the first substrate and the second substrate, wherein a width (a) of the transmission portion of the mask is a=L+2M, where M represents a mask margin and is about $0<M\leqq10$ μm, where d represents a step height of the h pixel electrodes, where L represents a width of the stepped portion of the pixel electrodes and L=d/tan θ, where θ represents a taper angle of the pixel electrodes.

2. The method according to claim 1, further comprising:
forming a second alignment layer on the second substrate;
performing a primary alignment process on the second alignment layer using a rubbing process;
covering the second alignment layer with a mask, the mask having a transmission portion and a blocking portion;
performing a secondary alignment process on an entire surface of the second alignment layer by irradiating a beam having a predetermined energy on the mask.

3. The method according to claim 1, wherein the beam having the predetermined energy in the secondary alignment process is one of a linearly polarized light, a partially polarized light, and a non-polarized light.

4. The method according to claim 2, wherein the irradiation energy of the beam is about 0.001-5 J/cm$^2$.

5. The method according to claim 1, wherein the first alignment layer has a permittivity of about 2-5.

6. The method according to claim 1, wherein the first alignment layer has a refractivity of about 1-2.

7. The method according to claim 1, wherein the taper angle of the pixel electrode is about $10°<\theta\leqq90°$ and the step height of the pixel electrode is about 3000~7000 Å.

8. The method according to claim 1, wherein a rubbing direction of the primary alignment process coincides with a light irradiation direction of the secondary alignment process.

9. A method of forming an alignment layer, comprising:
forming an alignment layer on a plurality of pixel electrodes of a substrate;
rubbing the alignment layer;
covering the alignment layer with a mask, the mask including transmission portions corresponding to at least stepped portions of the pixel electrodes that have a non-uniform alignment in the rubbing process; and
partially irradiating light on the rubbed alignment layer corresponding to at least the stepped portions of the pixel electrodes via the transmission portions of the mask,
wherein a width (a) of the transmission portion of the mask is a=L+2M, where M represents a mask margin and is about $0<M\leqq10$ μm, where d represents a step height of the pixel electrodes, where L represents a width of the stepped portion of the pixel electrodes and L=d/tan θ, where θ represents a taper angle of the pixel electrodes.

10. The method according to claim 9, wherein irradiating light includes using one of a linearly polarized light, a partially polarized light, and a non-polarized ultraviolet light.

11. The method according to claim 10, wherein the light irradiation energy is about 0.001-5 J/cm$^2$.

12. The method according to claim 9, wherein the alignment layer has a permittivity of about 2-5.

13. The method according to claim 9, wherein the alignment layer has a refractivity of about 1-2.

* * * * *